Patented May 9, 1933

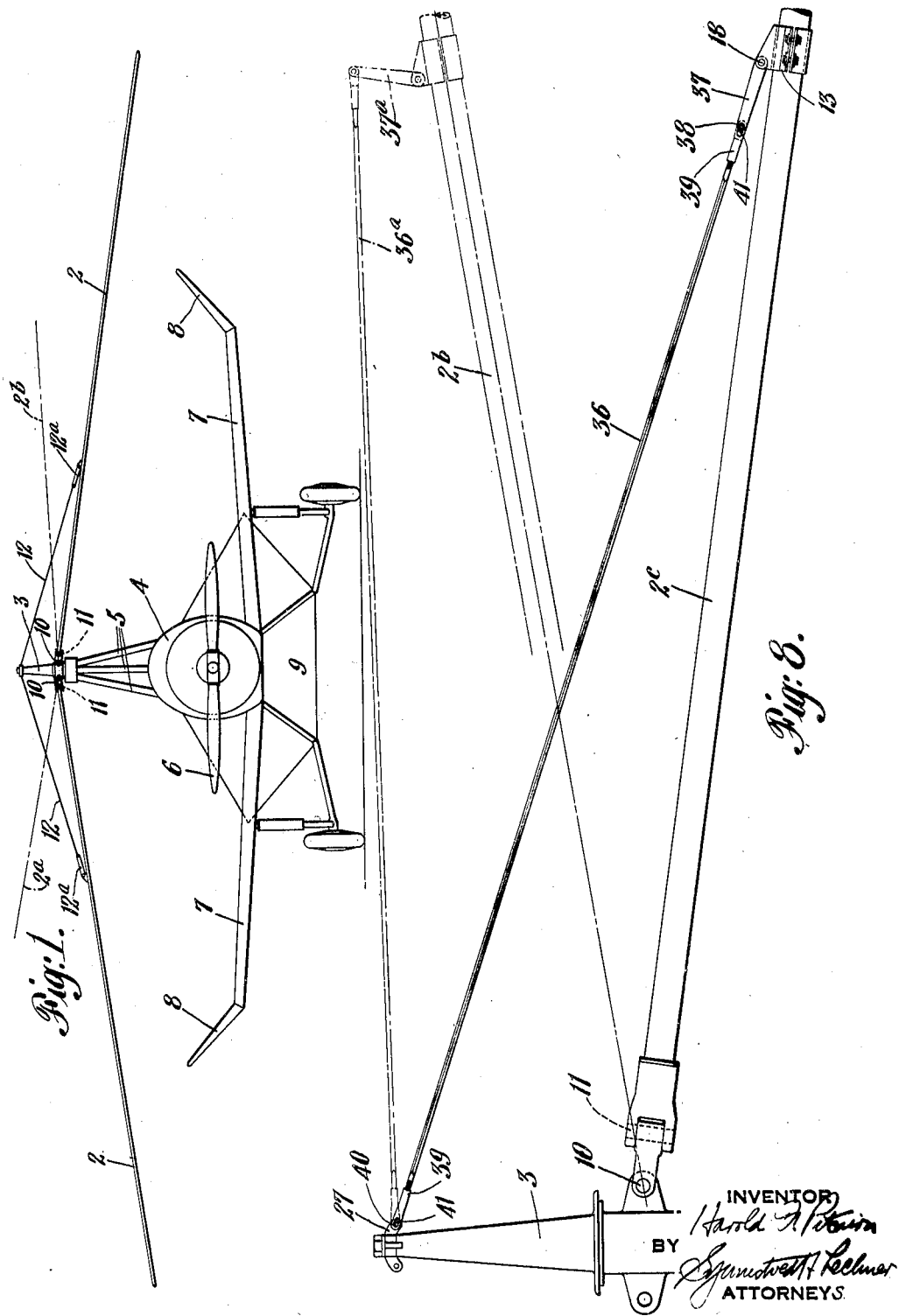

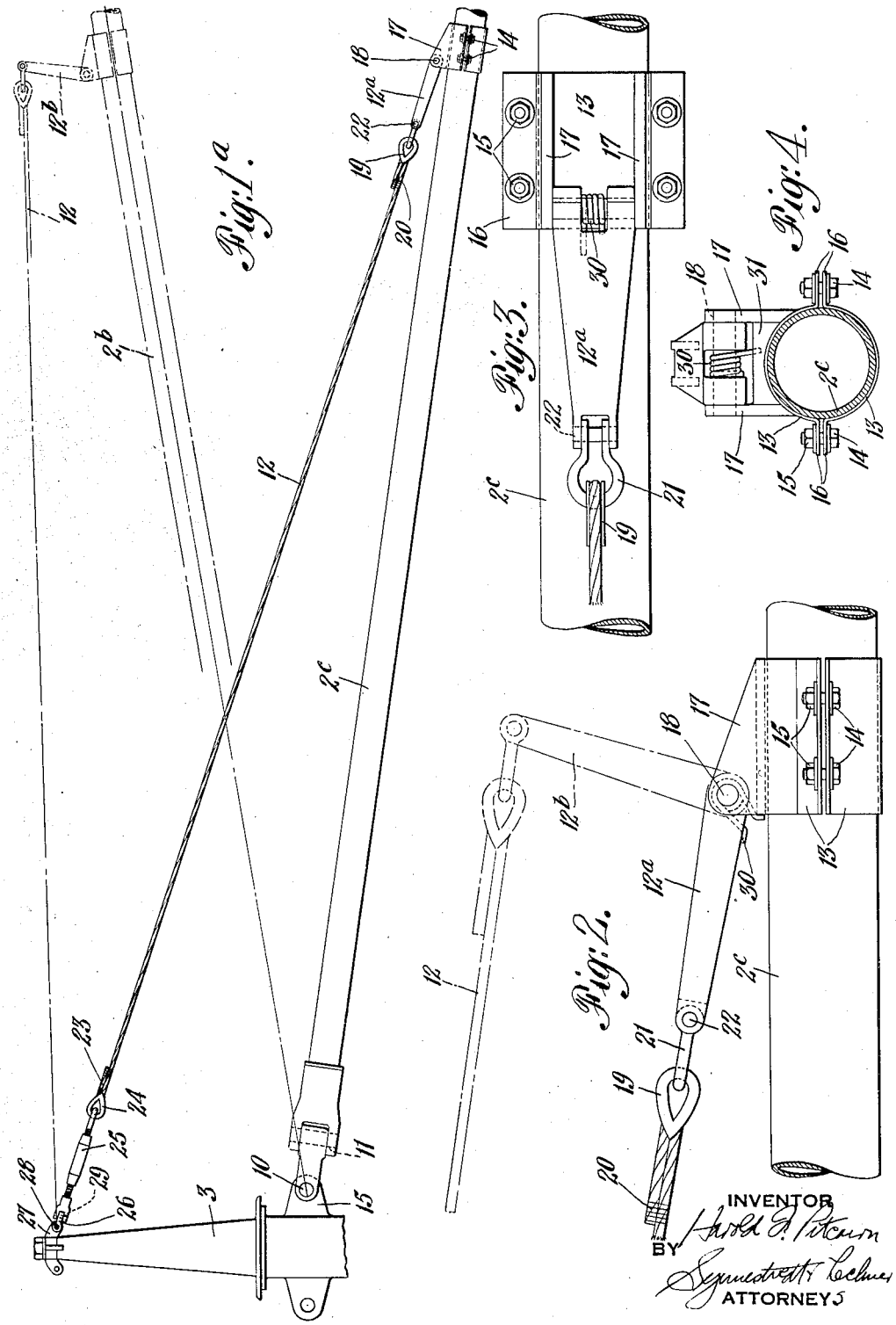

1,908,177

UNITED STATES PATENT OFFICE

HAROLD F. PITCAIRN, OF BRYN ATHYN, PENNSYLVANIA, ASSIGNOR TO AUTOGIRO COMPANY OF AMERICA, OF PHILADELPHIA, PENNSYLVANIA, A CORPORATION OF DELAWARE

AIRCRAFT WITH ROTATIVE BLADES OR WINGS

Application filed May 22, 1931. Serial No. 539,208.

This invention relates to aircraft with rotative blades or wings, and is especially useful in craft in which such blades or wings have a rotative mount about which they may be rotated and with respect to which they may be swingingly actuated under the influence of air flow, inertia, drag and anti-drag forces, or flight forces generally.

In aircraft of the rotative sustaining-blade type it is desirable that the blades or wings have freedom (and generally complete freedom) individually to swing under the action of flight forces, as more fully set forth in the copending application of Juan de la Cierva, Serial No. 145,655, filed November 1st, 1926, but at the same time it is necessary to prevent the wings, especially when at rest or in slow rotation, from drooping too far and fouling other parts of the machine. The latter purpose has been served by the provision of cables attached to the several blades or wings and to the rotative hub or axis or to an upward extension of the latter.

Among the primary objects of the present invention are: to obviate possible breakage or other failure of blade droop supports, either of the type just mentioned or of other types; to avoid interference, mechanical and aerodynamical, between the blades and their supports; to minimize parasite drag of the supporting means themselves; to eliminate fatigue in the supports, due either to bending or vibration; to shorten the overall length of the support as the distance between its points of attachment is shortened when the blade swings or pivots; to take up slack in the support, especially of the cable type; to utilize centrifugal force of rotation in accomplishing certain of the foregoing objects; and in general to simplify, make safer, and render more efficient the construction and operation of the sustaining blades or rotor and of the machine as a whole.

More specifically, I contemplate: certain flexible or pivotal connections for the blade droop supports; certain advantageous jointed supports; especially of cable or rod construction; streamlining of the supports in the direction of rotation; provision of pivoted lever means for utilizing centrifugal action to "take up" the support as well as to lift it from the position or zone of the blade itself; and provision of certain improved rotative-blade droop supports; or means of connection between the several blades and the common rotational axis structure thereof, and especially a construction of such supporting or connecting means which will allow full freedom of blade displacement movements in flight, particularly when the blades are provided with dual articulations or double hinge joints connecting them to the center or axis of rotation.

How the foregoing objects and advantages, together with others which may occur to those skilled in this art, or which may be incident to the invention, are attained will be evident from the following description, taken together with the accompanying drawings, in which drawings Figure 1 is a somewhat diagrammatic, front elevational view of an aircraft of the rotative wing type embodying a form of the present invention;

Figure 1a is an enlarged, fragmentary view of the central hub structure and a portion of the main longitudinal spar of the rotative blade appearing on the right of Figure 1;

Figure 2 is a still further enlarged detail showing of the connection and operation of the blade droop support of Figure 1a with respect to the blade;

Figure 3 is a top plan view of the construction of Figure 2;

Figure 4 is an elevational view taken from the right of Figure 2, and showing the main spar of the blade in section;

Figure 5 is a view similar to Figure 1a, but illustrating an improved form of fitting for the blade support member, and an upward-stop-member for the blade;

Figure 6 is a view similar to Figure 2, but showing a modification of the invention;

Figure 7 is an end elevational view, similar to Figure 4, of the structure shown in Figure 6; and Figure 8 is a view similar to Figure 1a, but of a modified form of blade droop support.

In all the figures, for the sake of simplicity, the aircraft construction is indicated as having only two rotative blades 2, but it will be understood that there are generally four such blades, equispaced around the central hub or axis member 3, and that any number of blades may be employed.

By reference first to Figure 1, it will be seen that the rotative blades 2 are mounted above the fuselage or body of the craft 4, preferably by means of a pylon formed of a plurality of legs 5, which pylon mounts the rotational axis 3, in such manner that the blades and their axis may be rotated in a generally horizontal path under the influence of relative air flow induced either by downward movement of the craft through the air or by forward movement of the craft as for instance when in forward flight under the influence of the propeller 6. In accordance with present practice in this particular art, the aircraft is provided with a pair of supplemental fixed wings 7 having up-turned tips 8, as well as with a wide undercarriage indicated in general at 9, the undercarriage here shown being fully described and claimed in the copending application of Agnew E. Larsen, Serial No. 528,280, filed April 7th, 1931.

In accordance with the disclosure in the copending application of Juan de la Cierva, Serial No. 414,901, filed December 18th, 1929, and Serial No. 500,064, filed December 4th, 1930, the relationship of the fixed wings and up-turned tips 7 and 8, and of the rotative blades which have horizontal and vertical pivots 10 and 11, is such that the rotative wings or blades are positioned above the fixed wings, and droop down toward the up-turned tips when at rest. To prevent the blades 2 from fouling on the wing tips 8 or on the propeller 6 or on the tail structure (not shown), especially when the machine is at rest or when the rotation of the blades has not reached a speed where the centrifugal force of rotation will hold them in extended position, it has heretofore been the practice to provide droop cables or supports 12 interconnecting the tip of the axis member 3 and the blades at points spaced out from said axis member.

As the rotor is turned up to speed, by the relative air flow in flight, the blades 2 swing upwardly on their horizontal pivots 10, under the action of centrifugal force, and due to the unequal lift moments arising from translational movement of the craft, the blade advancing in the line of flight may move up to an angle indicated at 2a, and the blade which is retreating with respect to the line of flight may assume an angle indicated at 2b. For proper flight operation, the blades must be substantially or entirely free individually to assume, at all points of their rotation, angles which compensate for differences in lift, inertia, and other forces, and the supporting cords or cables, as heretofore employed, have accomplished this end by simply slackening automatically as the blades move upwardly. Additional problems have had to be met by virtue of the additional articulation of the blades on the vertical pivot axis 11 which permits the blades to move fore and aft in the general path of rotation. It has been found that whipping around of the droop supports has resulted, with attendant loss in aerodynamic efficiency of the supports themselves, interference with the aerodynamic efficiency of the blade, tapping or rubbing of the lower portion of the support on the surface of the blade, tendency to fatigue of the supports or their securing elements by bending or vibration, and loosening or fraying of the cable near its ends.

Fullest safety, efficiency, flexibility, strength and simplicity in the droop supports are attained by my invention, and all of the possible difficulties just mentioned are substantially obviated, by a construction which I have illustrated in a preferred form in Figure 1a. In this figure, the covering of the blade has been removed, to expose the main longitudinal tension spar or tube 2c thereof. At a distance out on the spar from the horizontal and vertical articulations 10 and 11, I provide a fitting or bracket 13, preferably of a split type, secured by means of bolts 14 and nuts 15 (seen best in Figures 2, 3 and 4); the bolts and nuts, and the flanges 16 through which they pass, being positioned at either side of the spar 2c, to grip the fitting tightly on the spar without piercing the latter. Between the up-turned ears 17, on the upper half of the split fitting, I pivot a lever 12a, which is formed as an extension or jointed part of the droop cable or support 12. The pivot 18 of the lever 12a has its axis disposed transversely of the longitudinal axis of the blade. The connection of the cable 12 to the lever 12a may be by means of a bight or loop passing around the thimble 19, the cable end being wired in place as at 20, and the ring being connected by a shackle 21 and pivot pin 22 to the upper end of the arm 12a. The connection between the ring 19 and the shackle 21 thus involves substantially a universal pivot joint.

At its upper end, the cable or droop support 12 is connected to the tip of the hub or cone member 3, by means of an upper loop 23, ring 24, turnbuckle 25, shackle 26 and ear 27, dual articulation of the connection being attained by the pivots 28 and 29, which are angularly disposed with respect to each other, as well as by the substantially universal connection between the turnbuckle 25 and the ring or thimble 24. As seen in Figures 2, 3 and 4, I have provided means in the form of a small coil spring 30, acting between the flange or stop 31 and the arm or lever 12a to tend to swing the lever upwardly on its pivot 18. This spring need be made of only sufficient strength to ensure that under no conditions shall the centrifugal action on the droop support as a whole, or on the lever 12a act on or below a dead center line through the pivot 18 of the lever. Thus, when the blade swings upwardly as indicated at 2b in Figure 1a, centrifugal force, acting on the lever will swing it upwardly to a position indicated in dot and dash lines at 12b. This action will always be automatic, and may be augmented by suitably weighting the lever 12a, and the effective action of the centrifugal force will increase as the lever moves toward the vertical position 12b. That is, the centrifugal action tending to shorten the effective length of the blade droop support will increase as the need for shortening increases. Furthermore centrifugal force due to the weight of the cable itself tends to cause the cable to straighten out and assists the action of the lever 12. Slack in the droop support is thus automatically taken care of, full freedom of blade movement is provided, vibration or whipping around of the droop support is minimized, bending and fraying of the connections or cable ends is obviated, interference either mechanical or aerodynamical between the blade and its support is eliminated, and due to a moderate tautness placed on the support its own drag is reduced, while yet a certain amount of bowing of the cable under the action of the air may be permitted by the universally jointed arrangements.

In the construction illustrated in Figures 5 to 7, the main parts are similar to those just described, but improved cable terminals are here provided to cut down still further the parasite drag, to simplify the connections of the cable, and to prevent all loose or frayed cable ends. These parts comprise, at each end of the cord or cable 12, a special fitting 32 pressed onto the cable and screwed into the fork end 33. The screws may be reversely threaded for length adjustment, and at each end dual pivots 28 and 29 are provided. The arm 12a is pivoted at 18, as before, but in place of the spring device 31 I have provided a stop member 34 fixed on the arm 12a to abut against the lug or ear 35, to ensure that the arm 12a when in lowermost position shall not pass down to or below dead center. This construction it will be seen is in general considerably simplified over the construction previously described. A further advantage is afforded by the stop device or spring-metal arm 3c, which is mounted on axis member 3, as by bolts 3d, to resist or prevent excessive upward blade movement. This further prevents excessive outward pivotation of arm 12a.

Turning now to Figure 8, it will be seen that I have illustrated a jointed rod construction comprising a long rod member 36 and a short rod member 37, pivoted together at 38. The rod 36 may be streamlined as shown (as may also be the rod member 37) in the direction of rotation of the rotative wing, which not only reduces drag to a minimum but gives a rigidity in that direction tending to prevent bowing of the support. It is further preferably reversely screw threaded into the two end terminal fittings 39, the lower of which receives the pivot 38 and the upper of which receives the pivot 40. A split bracket 13 and a pivot member 18 are provided as before. The action of this construction is indicated at 36a, 37a in Figure 8, with the blade moved upwardly considerably, to the position 2b. Since this arrangement reduces to a minimum the bowing effect under the action of the air flow, it requires less freedom of movement of the terminals in a direction fore and aft of the direction of rotation. I therefore may eliminate the pivots 29 (used in construction of Figure 5), and may obtain a slight universal movement by merely elongating the pivot receiving apertures 41 in the terminals 39, as shown. If desirable, however, universal connections may be used in this construction.

From the foregoing it is evident that each of these constructions has certain definite specific advantages, but that they all embody the chief advantages heretofore outlined, and all operate on a principle which involves primarily the utilization of the centrifugal action already present in the rotative system, the shortening of overall length or take up of slack of the droop support, the permitting of full freedom of movement of the blades or wings, and the prevention of interference of any kind between the blades and their supports.

What I claim is:

1. In an aircraft, a sustaining blade, a rotative mounting therefor, means providing for swinging actuation of the blade under the influence of relative air-flow and other forces, and a flexibly-jointed support to retain the blade as against excessive downward droop.

2. In an aircraft, a sustaining blade, a rotative mounting therefor, means providing for swinging actuation of the blade under the influence of relative air-flow and other forces, means for supporting the blade as against excessive downward droop, and means actuated at least in part by centrifugal force for taking up slack in the supporting means as the blade swings upwardly.

3. In an aircraft, a sustaining blade, a rotative mounting therefor, means providing for swinging actuation of the blade under the influence of relative air-flow and other forces, and a jointed-rod supporting construction for retaining the blade as against excessive downward droop.

4. In an aircraft, a sustaining blade, a freely rotative mounting therefor, means providing for free swinging actuation of the blade under the influence of relative air-flow and other forces in flight, and a rod structure having movable joint connections to the rotative mounting and to the blade at a point removed from said mounting, and arranged to freely permit normal blade swinging in flight.

5. In an aircraft, a sustaining blade, a rotative mounting therefor, means providing for swinging actuation of the blade under the influence of relative air-flow and other forces, on at least two axes, and a droop support for the blade having flexible joint means so arranged that the blade may freely swing on both axes.

6. In an aircraft, a sustaining blade, a rotative mounting therefor, means providing for swinging actuation of the blade under the influence of relative air-flow and other forces, on at least two axes, and a droop support for the blade having a plurality of joint means arranged to relieve the support of bending stresses.

7. In an aircraft, a sustaining blade, a rotative mounting therefor, means providing for swinging actuation of the blade under the influence of relative air-flow and other forces, on at least two axes, and a droop support for the blade having a plurality of pivots arranged at angles to one another.

8. In an aircraft, a sustaining blade, a rotative mounting therefor, means providing for swinging actuation of the blade under the influence of relative air-flow and other forces, means for supporting the blade as against excessive downward droop, and means for effecting movement of the main portion of the supporting means away from the blade as the blade swings upwardly.

9. In aircraft mechanism of the character described, a swingable, rotative blade, a central mount therefor, a rod member mounted on the blade including therefor a pivot having an axis substantially transverse the longitudinal axis of the blade, and another rod member movably connected to said first rod member and to said mount.

10. A device for taking up slack in a rotative blade droop-support, which includes a pivoted member actuated under the influence of blade movement to move on a pivot and take up such slack.

11. A device for varying the overall length of a rotative swingable-blade droop-support, which includes a pivoted member actuated at least in part by centrifugal force.

12. A device for varying the overall length of a rotative swingable-blade droop-support, which includes a pivoted member actuated at least in part by centrifugal force, the direction of pivotation being so disposed with relation to normal rotation and swinging of the blade that the effectiveness of the centrifugal action on the said device progressively increases as the overall length of the support decreases.

13. A device for taking up slack in a rotative blade droop-support, which includes a pivoted member actuated at least in part by centrifugal force to move on a pivot and take up such slack, together with stop means for preventing said pivoted member from taking a position on or past dead center considered with relation to its pivot and the line of centrifugal action.

14. A device for taking up slack in a rotative blade droop-support, which includes a pivoted member actuated at least in part by centrifugal force to move on a pivot and take up such slack, together with a resilient device tending to move said pivoted member in the general direction of the line of centrifugal action.

15. In an aircraft, a sustaining blade, a rotative mounting therefor, means providing for swinging actuation of the blade under the influence of relative air-flow and other forces, and a streamlined jointed rod connected to the rotative mounting and to the blade at a point removed from said mounting.

16. In aircraft rotor mechanism of the character described, a rotor-blade support including a flexible element, a rigid element, and means of pivotal connection between the two, all said parts being so arranged that the rigid element may move to take up slack in the flexible element.

17. In an aircraft, a sustaining blade, a rotative mounting therefor, means providing for swinging actuation of the blade under the influence of relative air-flow and other forces, a flexibly-jointed supporting construction for retaining the blade as against excessive downward droop, and means for limiting upward movement of the blade.

In testimony whereof, I have hereunto signed my name.

HAROLD F. PITCAIRN.